United States Patent
Mueller-Dombois

(10) Patent No.: US 6,775,202 B2
(45) Date of Patent: Aug. 10, 2004

(54) METHOD AND A DEVICE FOR REPRODUCING SOLID BODY VIBRATIONS FOR THE PREDICTION OF FRACTURE PROCESSES IN SOLID BODIES, PARTICULARLY IN THE EARTH CRUST

(75) Inventor: Florian Mueller-Dombois, Cologne (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 0 days.

(21) Appl. No.: 10/207,186

(22) Filed: Jul. 30, 2002

(65) Prior Publication Data

US 2003/0021183 A1 Jan. 30, 2003

(30) Foreign Application Priority Data

Jul. 30, 2001 (DE) .......................................... 01 118 259

(51) Int. Cl.[7] .......................... H04B 17/00; G01V 1/00; G08B 21/00
(52) U.S. Cl. ........................................ 367/13; 340/690
(58) Field of Search ................... 367/13, 178; 340/690; 702/15

(56) References Cited

U.S. PATENT DOCUMENTS

| | | | |
|---|---|---|---|
| 4,792,145 A | | 12/1988 | Eisenberg et al. |
| 5,134,591 A | * | 7/1992 | Harmeling .................. 367/135 |
| 5,625,348 A | * | 4/1997 | Farnsworth et al. ........ 340/690 |

FOREIGN PATENT DOCUMENTS

| JP | 08263771 | * 10/1996 | ........... G08B/21/00 |
|---|---|---|---|

OTHER PUBLICATIONS

Frantti et al., "Auditory Discrimination of Seismic Signals from Earthquakes and Explosions", Bull Seismol Soc. Amer., vol. 5 No. 1. pp. 1–25, Feb. 1965.*
Frantti et al., Bulletin of the Seismological Society of America, vol. 55, pp. 1–25, No. 1 (1965).
Gregory Kramer, Auditory Display, Senification, Audification & Auditory Interfaces, vol. 18, pp. 369–404 (1994).
Florian Dombois, Ein Versuch Zur Erweiterung Seismologischer Darstellungsweisen, pp. 195–205 (1966).
Florian Dombois, Using Audification In Planetary Seismology, pp. 1–3 (2001).
Sheridan Dauster Speeth, The Journal Of The Acoustical Society Of America, vol. 33, pp. 909–916, No. 7 (1961).
Yasukawa H. et al., Auditory Sonification For Elf Band Signal Of Siesmic Electromagnetic Radiation, pp. 1–7 (2000).

* cited by examiner

Primary Examiner—Ian J. Lobo
(74) Attorney, Agent, or Firm—Birch, Stewart, Kolasch & Birch, LLP

(57) ABSTRACT

A device for reproducing solid body vibrations for the prediction of fracture processes in a solid body, particularly in the earth crust, is provided with at least one vibration recording means for recording vibrational data from the surface of a solid body, a data converter for converting the vibrational data recorded by the vibration recording means, the data converter compressing the recording time of the vibrational data such that the frequency range of the vibrational signal extends into the audible frequency range of human beings, and an audio amplifier playing the converted data. Further, the device comprises a frequency separating filter, at least one loudspeaker and a soundfloor, the data played by the audio amplifier being passed on to the loudspeaker or the soundfloor via the frequency separating filter in correspondence with the frequencies thereof.

9 Claims, 1 Drawing Sheet

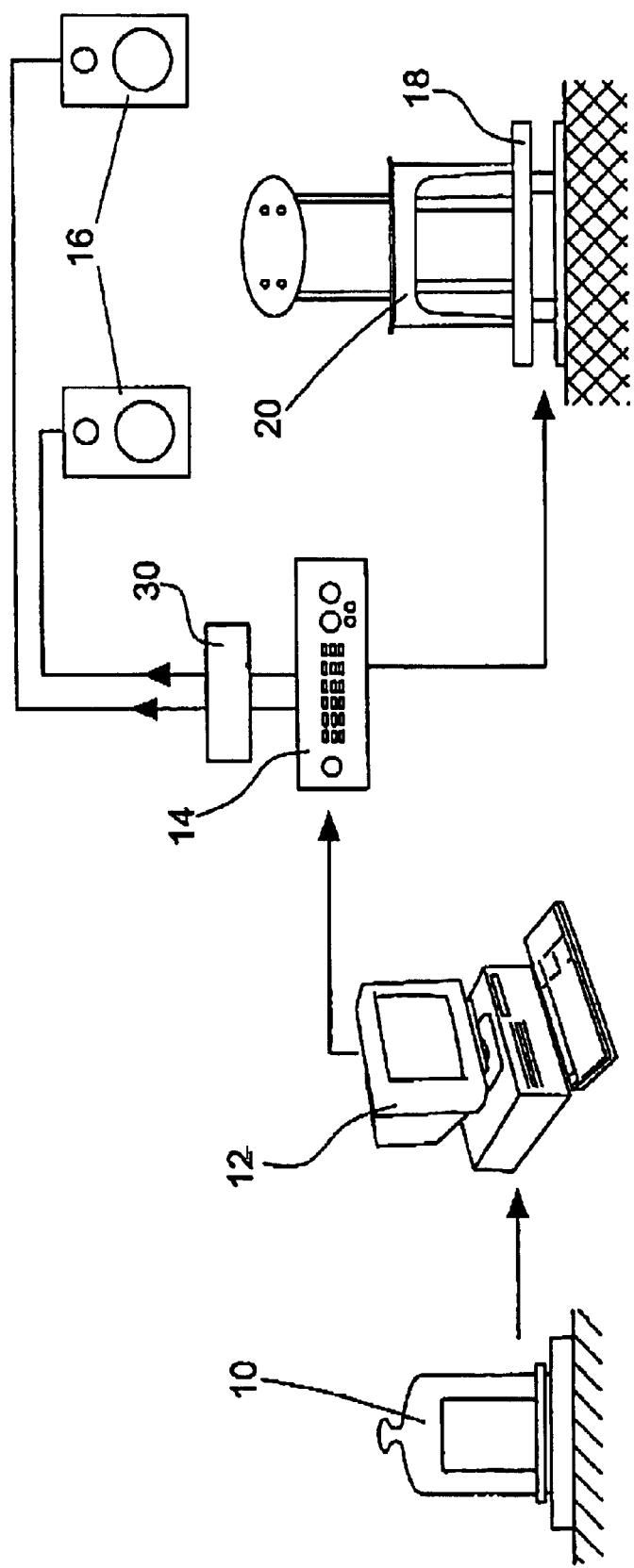

METHOD AND A DEVICE FOR REPRODUCING SOLID BODY VIBRATIONS FOR THE PREDICTION OF FRACTURE PROCESSES IN SOLID BODIES, PARTICULARLY IN THE EARTH CRUST

This nonprovisional application claims priority under 35 U.S.C. § 119(a) on European Patent Application No. 01 118 259.9 filed in the European Patent Office on Jul. 30, 2001, which is herein incorporated by reference.

BACKGROUND OF THE INVENTION

1. Field of the Invention

The present invention relates to a method and a device for reproducing solid body vibrations for the prediction of fracture processes in solid bodies, particularly in the earth crust, and thus for the prediction of earthquakes.

2. Description of the Background Art

The most important measuring device in seismology is the seismometer. The data acquired by the seismometer form the basis of the seismological exploration of the interior of the earth. Since the invention of the seismometer about a hundred years ago, the improvement of the measuring device and the global multiplication of the measuring stations has been one of the most eminent objects of seismology. Within a short time, the measurements brought about great progress in the comprehension of the internal structure and the constitution of the, earth. Meanwhile, there exists a worldwide network of seismic stations acquiring precise data round the clock. The archives of seismic registration have a very great stock of seismograms, which are continuously increasing.

To the same extent that the structural description of the earth structure gets finer, the progress in the temporally oriented earthquake prediction research stagnates. Temporal prediction, i.e., a short-range, medium-range and long-range prediction about the location and dimension of an earthquake is still lacking.

So far, ground vibrations have been illustrated in geophysics as seismograms, i.e., as a curve in a Cartesian coordinate system. To extract a useful, clear piece of information from the complex signal, the times of arrival of earthquake waves are typically determined and therefrom, among other things, the epicenter, depth of the hypocenter and magnitude of an earthquake are calculated. The event data are compiled in catalogues, and these catalogues form the basis of almost all seismologically oriented prediction researches. Respectively different statistical methods are performed by means of the catalogue data to draw conclusions from the space-time micro- and macro-quake activity with respect to future events.

With respect to the prediction of earthquakes, however, these methods suffer from the disadvantage that they do not use the data of the time-continuous seismograms, but use the data of the catalogue information that are reduced to individual points of time. Furthermore, supraregional movements like remote earth tremors, natural vibrations etc. are generally not considered in local catalogue data, since the number of events to be evaluated would increase overproportionally otherwise. The examination of the phenomenon of the relay earthquakes, wherein the spreading wave of an earthquake triggers another event, is too time-consuming with purely visual techniques of illustration and evaluation. Not least, the methods of prior art have the disadvantage that in a purely visual illustration and evaluation, not all of the features required for the prediction of earthquakes become apparent.

If the state of tension and the course of the predecessor phenomena in time up to the actual fracture of the earth crust, i.e., up to the formation of an earthquake, is to be studied, the data has to be edited such that a development is recognizable.

A dynamic kind of editing seismic data known in the prior art is the audification. The basic idea of accelerating seismic signals and interpreting them as audio signals was first published by S. D. Speeth in Seismometer Sounds, Journal of the Acoustical Society of America 33: 909–916 in 1961. Speeth used a method to distinguish between signals of natural earthquakes and those signals arising from nuclear explosions.

Frantti and Leverault pursued this approach and scrutinized the average rate of success in an extended user study in 1965 (Frantti, G. E. and L. A. Leverault (1965). Auditory Discrimination of Seismic Signals from Earthquakes and Explosions. Bulletin of the Seismological Society of America 55: 1–25).

In 1994, Hayward published on audification and presented a relatively detailed introduction into the method (Hayward, C. (1994). Listening to the Earth Sing. Auditory Display. Sonification, Audification, and Auditory Interfaces. G. Kramer. Reading, Addison-Wesley: 369–404).

In 1988, Dombois proposed the method of audification for the first time in connection with earthquake research, but he did not give any definite indications on how to translate it into practice (Dombois, F. (1998). Über Erdbeben. Ein Versuch zur Erweiterung seismologischer Darstellungsweisen. Diss. Berlin, Humboldt-Universität. (§ 17 in particular)). In Using Audification in Planetary Seismology, Proceedings of the 2001 International Conference on Auditory Display, Espoo, Finland, July 29 to Aug. 1, 2001, Dombois presented a qualitative evaluation of the sounds resulting from the audification of seismological data.

SUMMARY OF THE INVENTION

Therefore, it is an object of the present invention to provide a device for reproducing solid body vibrations for the prediction of fracture processes in solid bodies, particularly in the earth crust, which does not only use event recordings, but the totality of the continuously acquired data, processes and makes supraregional movements perceptible as well and utilizes further means beside the already known visual representation and evaluation in order to predict an earthquake as precise as possible.

To solve this object, the invention provides a device for reproducing solid body vibrations for the prediction of fracture processes in a solid body, particularly in the earth crust. The device includes at least one vibration recording means for recording vibrational data from the surface of a solid body and a data converter for converting the vibrational data recorded by the vibration recording means. The data converter compresses the recording time of the vibrational data such that the frequency range of the vibrational signal extends into the audible frequency range of human beings. The device further includes an audio amplifier playing the converted data, a frequency separating filter, at least one loudspeaker and a soundfloor. The data that is played by the audio amplifier are passed on to the at least one loudspeaker and the soundfloor via the frequency separating filter in correspondence with the frequency thereof.

The present invention is based on the cognition of perception psychology and sensory philosophy that the hearing surpasses the abilities of the eye by far as to the perception of temporal dynamics, of continuum and of the tension between memory and expectation. Correspondingly, according to the invention, the vibrational data recorded by a seismometer are edited by a data converter and subsequently by an audio amplifier such that they are audible for the user. Since the frequencies of a seismic signal cover about 17 octaves, the human ear, however, is only able to perceive 10 octaves, a vibration reproduction by a soundfloor is used in parallel with the audio reproduction. The soundfloor enables the user to feel the infrasound of the converted seismometer signal as ground movement. A soundfloor can be a spring-loaded floor plate under which a bass loudspeaker or sub-woofer having a high mass is mounted. By inputting audio signals of low frequency, the floor can be set in vibration in conformity with the signals and acts as an active vibration floor. Originally, the soundfloor technology has been developed for dance floors in discotheques, but meanwhile, it is also used in virtual reality displays.

In contrast to the seismic catalogues used in the prior art, the device according to the invention leaves the flux of data continuously recorded by the seismometer unreduced. Only the time axis of the recorded data flux is compressed by the data converter. Thus, supraregional movements such as the so-called background noise, the transient response behavior of earthquake signals and the dynamic characteristic in the acoustic/haptic reproduction of the data are preserved. Since the ear is able to process and interpret the superposition of several vibrations, it is easier for human beings to perceive the acoustic signal than visual signals. The human ear distinguishes signals from noise without having to filter the measured data.

Due to the acceleration or reduction of the time axis of the signals recorded by the seismometer, the flux of data is shortened. Instead of having to follow 24 hours of a seismic registration, 43.2 seconds are preferably sufficient according to a preferred embodiment of the invention, with the data compression factor being 2000. This means that the reprocessing of the acquired data is sufficiently fast so that there remains time for the expectation of events to come, which means earthquakes in this case. Compared with methods of the prior art, the evaluation can be substantially shortened. Furthermore, according to the invention, the temporal aspect of the phenomenon can be experienced in a temporal medium the tension of the continuum can be as well heard as felt. Basing on the hearing of past earthquakes, the ear concentrates on the signs of new events.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawing which are given by way of illustration only, and thus, are not limitive of the present invention, and wherein the figure shows a block diagram of a device for reproducing solid body vibrations, according to a preferred embodiment of the invention.

DETAILED DESCRIPTION OF THE PREFERRED EMBODIMENT

The figure shows an accelerometer or wide band seismometer 10 suited for measuring the surface vibration of a solid body, for example, the earth's crust. The data recorded by the seismometer 10 are supplied to a computer 12 which converts these data such that the time axis of the continuously recorded data is compressed until the frequency range of the vibrational signal reaches into the audible range of human beings. With seismologic data, this corresponds to an acceleration of about 2000 times. If necessary, the computer 12 has to adapt the dynamic range of the recorded data to human hearing here (compare the 24- or 32-bit registration in the seismological range in contrast to the 16-bit storage in the audio range). After their conversion, the data are played by an audio amplifier 14 and distributed to the loudspeakers 16 and the soundfloor 18 via a frequency separating filter 30. In doing so, frequencies of the converted data flux between 20 Hz and 20 kHz are preferably reproduced as sound via the loudspeakers, and the converted data flux portions with low frequency below 20 Hz are preferably reproduced as vibration via the soundfloor. On the soundfloor 18, a chair 20 may be arranged to offer a comfortable seat and a better haptic perception to the user.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A device for reproducing solid body vibrations for the prediction of fracture processes in a solid body, particularly in the earth crust, comprising:

at least one vibration recording means for recording vibrational data from the surface of a solid body;

a data converter for converting the vibrational data recorded by the vibration recording means, the data converter compressing the recording time of the vibrational data such that the frequency range of the vibrational signal extends into the audible frequency range of human beings;

an audio amplifier for amplifying the converted data;

a frequency separating filter;

at least one loudspeaker; and a soundfloor, wherein the data amplified by the audio amplifier are provided to the at least one loudspeaker and the soundfloor via the frequency separating filter in correspondence with the frequency thereof.

2. The device according to claim 1, wherein a seismometer is used as the vibration recording means.

3. The device according to claim 1, wherein the data converter adapts the dynamics of the compressed vibrational data to human hearing.

4. The device according to claim 1, wherein the portions of the data flux converted by the data converter which have frequencies between 20 Hz and 20 kHz are reproduced as sound via the loudspeakers.

5. The device according to claim 1, wherein the low-frequency portions of the data flux converted by the data converter which are below 20 Hz are reproduced as vibrations via the soundfloor.

6. The device according to claim 1, wherein the data converter compresses the vibrational data recorded by the vibration recording means with respect to time with a compression factor of about 2000.

7. The device according to claim 1, wherein the solid body is the crust of the earth.

8. A method of detecting and reproducing vibrations, the method steps comprising:

receiving measured vibrations as a data stream, the measured vibrations being measured by a seismometer;

compacting the data stream such that the compacted data stream has a shorter period;

separating the compacted data stream into a first stream and a second stream on the basis of frequency; and inputting the first stream into a loudspeaker and inputting the second stream into a soundfloor.

9. An apparatus for detecting and reproducing vibrations, the apparatus comprising:

a data recorder for receiving a data stream outputted by a seismometer;

a data compactor for compacting the data stream such that the compacted data stream has a shorter period; and a frequency separating filter for separating the compacted data stream into a first stream and a second stream on the basis of frequency, wherein the frequency separating filter provides a loudspeaker with the first data stream and a soundfloor with the second data stream.

* * * * *